July 15, 1969  G. E. BARKER  3,455,532
ELECTROPNEUMATIC VALVE POSITIONER
Filed Sept. 15, 1965  5 Sheets-Sheet 1

INVENTOR
GEORGE E. BARKER
BY
Robert J. Schaap
ATTORNEY

July 15, 1969  G. E. BARKER  3,455,532
ELECTROPNEUMATIC VALVE POSITIONER
Filed Sept. 15, 1965  5 Sheets-Sheet 2

INVENTOR
GEORGE E. BARKER
BY
Robert J. Schaap
ATTORNEY

United States Patent Office 3,455,532
Patented July 15, 1969

3,455,532
ELECTROPNEUMATIC VALVE POSITIONER
George E. Barker, St. Louis, Mo., assignor to Monsanto Company, St. Louis, Mo., a corporation of Delaware
Continuation-in-part of application Ser. No. 455,797, May 14, 1965. This application Sept. 15, 1965, Ser. No. 487,433.
Int. Cl. F16k 29/00, 31/08, 31/12
U.S. Cl. 251—29
16 Claims

ABSTRACT OF THE DISCLOSURE

An electropneumatic valve positioner for controlling the valve plunger of a controllable valve in response to a control signal. The valve positioner includes a fluid pressure source, a relay acting upon the plunger and a pulsed solenoid control valve. An electrical sensor on the plunger of the main valve initiates a signal to the control circuit of the pulsed solenoid valve which will, in turn, actuate the relay to cause movement of the valve plunger of the main valve. The sensor will create a signal in proportion to the change of position and this will, in turn, generate a force pulse to create proper dithering action in the pulsed solenoid valve. The pulsed solenoid valve is reverse acting in that a no-flow condition is created upon energization of the coil so that the plunger will engage the valve seat on each pulse signal.

---

This application is a continuation-in-part of my copending application, Ser. No. 455,797, filed May 14, 1965, and which relates to electropneumatic valve positioners, which is in turn a continuation-in-part of my copending application Ser. No. 412,921, filed Nov. 23, 1964. This application is also a continuation-in-part of my copending application Ser. No. 487,537, filed Sept. 15, 1965 which relates to control valves.

This invention relates in general to certain new and useful improvements in valve positioners, and more particularly, to electropneumatic valve positioners with pulsed-solenoid flow action.

Today, automatic control instrumentation has found widespread use in many industries. Many processes, whether controlled manually or automatically, will perform well and efficiently only when the values of certain process variables are held wtihin given limits. Consequently, the employment of automatic control valves in many processing industries has grown steadily. However, many of the process variables in systems in which the presently available automatic control valves are employed are subject to dynamic changes. Consequently, the control valves now available are not capable of responding rapidly and accurately enough to the changes in the process variables. In order to overcome this problem, many of the control valves have been designed to provide sufficient force to position the valve accurately in proportion to the change in instrument pressure for most applications. Nevertheless, under difficult service conditions, this built-in force may not be sufficient to accurately position the valve in response to instrument pressure change.

In order to overcome the problems of positioning the valve accurately in proportion to changes in instrument pressure, valve positioners or so-called "operator positioners" have been employed in conjunction with the control valve. Valve positioners have found use in such applications as with single port valves capable of handling fluids which are subject to high pressure differentials or high pressure drops. They have found widespread use in installations which involve high pressures and therefore which require a tight valve stem packing. In similar manner, valve positioners are used in conjunction with valves capable of controlling viscous fluids or solids in a suspension state. Valve positioners have been found to be particularly useful in processes which contain process lag applications, such as temperature and pH control applications, or in installations where the control valve is located a great distance from the controller. Valve positioners have been found to be particularly useful in these applications, inasmuch as they assist in obviating the excess friction in the final control element, particularly in cases with high viscosity fluids. Moreover, the valve positioner is designed to reduce the dead band of the operator by at least 50% of the dead band normally occurring in valves without positioners. Furthermore, in a direct acting operator when high static unbalanced forces are present in the final control element, a positioner can deliver additional power in the form of higher air pressure than could be supplied from the pneumatic controller in order to hold the valve steam position.

While there is an omnipresent need for valve positioning in many control applications, the present commercially available valve positioners have not been employed in many applications where valve positioners are required or could improve the efficiency of the control operation. This is primarily due to the fact that valve positioners have achieved bad publicity in the past due to their inefficiency of operation. For any valve positioner to function properly, high loop gain is essential to overcome any loading effects placed on the valve. Since there are many and varied lagging-type components in the feedback loop, such as the volume of an air motor, oscillation and instability problems in the conventional valve positioners are common. It is this type of instability which has brought people in the process control industries to look upon valve positioners with disfavor.

The conventional valve positioners in practically all cases employ a variable flow orifice in the supply valve and which is made variable by a flapper valve or so-called "flapper assembly." The conventional valve positioner employs a nozzle which is covered by the flapper assembly and the size of this nozzle or orifice is greater than a fixed restriction in the supply valve, so that air can bleed faster than it is being supplied when the flapper valve is not restricting the orifice. Thus in the conventional valve positioners, when instrument pressure increases, the bellows of the valve will expand to move the beam, thereby causing the flapper to restrict the orifice. The orifice or nozzle pressure will increase and move a relay diaphragm assembly to open the main supply valve. The output pressure of the diaphragm of the control valve thereby increases moving the actuator stem or so-called "plunger" downwardly. A simple mechanical linkage, such as a cam and lever cause the beam to shift and which in turn causes the flapper valve to move away from the nozzle or orifice. As the nozzle pressure decreases and the relay supply valve closes to prevent any further increase in output pressure, the positioner is again in equilibrium but at a higher instrument pressure and a new valve plug position. However, valve positioners of this type inevitably contain backlash. Due to the fact that they operate a controllable element which has a large volume or may be distant to the control valve itself, there is often a problem of hysteresis.

It is, therefore, the primary object of the present invention to provide an electropneumatic valve positioner which is capable of varying the flow orifice by a pulsed-solenoid flow action.

It is another object of the present invention to provide an electropneumatic valve positioner of the type stated which employs an electrical feedback for generation of rate action and which, in turn, stabilizes the entire control system.

It is a further object of the present invention to provide a valve positioner of the type stated which contains a high loop gain and excellent dynamic response.

It is an additional object of the present invention to provide an electropneumatic valve positioner of the type stated which is adaptable for use in conjunction with control valves capable of being used in bench-scale equipment, pilot-plant equipment and commercial process equipment.

It is also an object of the present invention to provide an electropneumatic valve positioner of the type stated which can be employed in both low pressure and high pressure fluid systems.

It is still another salient object of the present invention to provide an electropneumatic valve positioner of the type stated which can be built in a small compact unit, which is relatively inexpensive to manufacture and has a high degree of reliability.

With the above and other objects in view, my invention resides in the novel features of form, construction, arrangement and combination of parts presently described and pointed out in the claims.

In the accompanying drawings (5 sheets):

Figure 6:
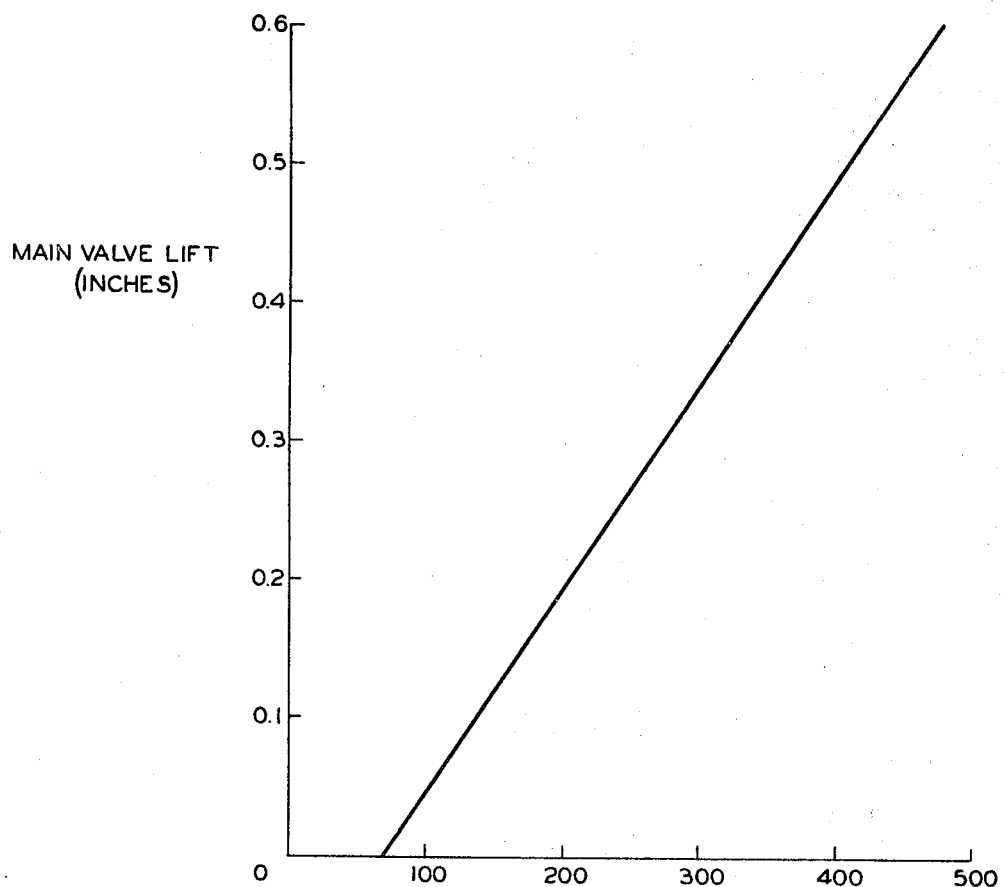
Figure 7:
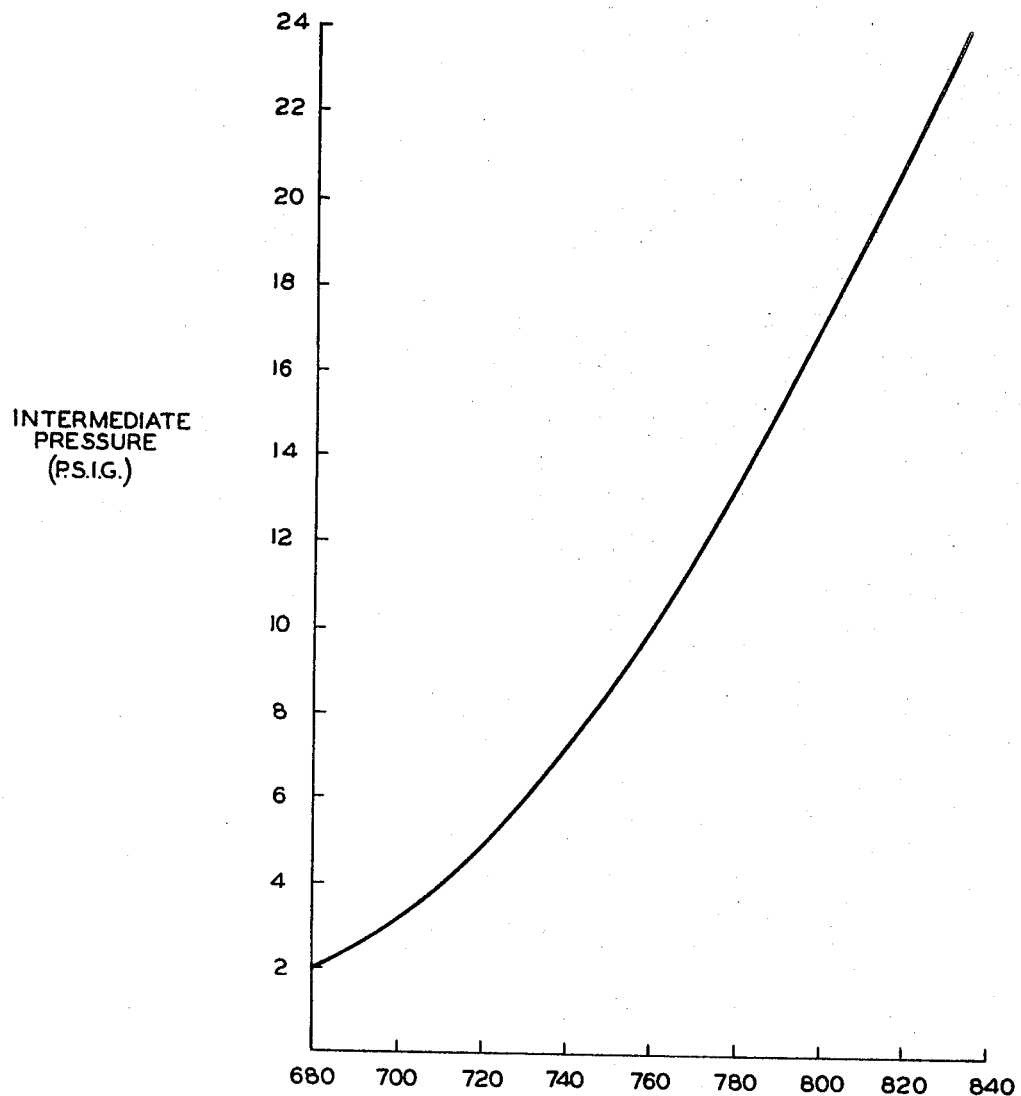

FIGURE 6 is a diagrammatic view of a plot showing the valve positioner characteristics where the lift of the main valve is plotted as a function of the potentiometer setting; and FIGURE 7 illustrates the transducer characteristics of the electropneumatic valve positioner of the present invention where the intermediate pressure from the control valve is plotted as a function of the potentiometer setting.

GENERAL DESCRIPTION

Generally speaking, the electropneumatic valve positioner of the present invention is a voltage-balance operating device and includes a pulsed-solenoid control valve having a plunger which may oscillate or vibrate with respect to a valve seat in response to an electrical signal from a control circuit. The control valve is capable of modulating control action by varying the voltage to the solenoid coil, and is designed to control fluid flow in response to changes of a measured physical variable. The valve is provided with an upper inlet fluid port, and a lower outlet fluid port. The valve plunger carries the valve seat which vibrates off of the upper inlet port, and thus controls the flow of fluid through the valve housing.

The valve plunger of the control valve used in the positioner herein described is biased away from the closed position by the combination of a spring, gravity and differential pressure forces. The magnetic force is generated by a pulsating current for the solenoid coil. The current, however, may be a direct current and of average magnitude which is sufficient to overcome the opening bias force on the valve plunger. The minimum magnetic force is, however, less than the bias force. In this manner, the valve plunger is on the average, held against the orifice of the inlet port in the closed position; but vibration off of the orifice is permitted by the current reduction accompanying negative control pulses from the control circuit.

As previously indicated, the control valve described herein is a normally open device where the plunger is biased away from the closed position by the various combinations of forces. A control circuit is provided for measuring changes in the measured physical variable and providing control pulses to the solenoid coil of the control valve. The control circuit generally includes a sensory mechanism for measuring the change in the sensed physical variable and a mechanism for converting this measured physical property change into a proportional voltage or current change. The control circuit includes a relaxation oscillator which is designed to convert the voltage or current changes into a sequence of timed pulses. Finally, a silicon controlled rectifier is provided for transmitting the current pulses in timed relationship to the solenoid coil for actuating the plunger. Thus, it is possible to maintain controlled vibration of the valve plunger off the seating orifice, if desired, for regulating the fluid flow in proportion to the change of the sensed physical variable. However, if desired, the control valve could be used as an electrically operable "pop-off" valve where vibration is not necessary.

The term "pulsed solenoid" with regard to control valves is a new concept in the art of control valves. In my copending application Ser. No. 412,921, filed Nov. 23, 1964, the theory of pulsed solenoid operation of normally closed control valves is described in detail. In the former of said applications, pulsed-solenoid flow control in the normally closed valve is understood to be the operation of a solenoid valve in such manner as to cause the plunger to vibrate off of the valve seat. The flow control is achieved by controlling the vibrational amplitude of the valve plunger through control of the current to the solenoid coil, thereby achieving an electrically actuated modulating valve. This type of action assumes that the maximum magnetic force generated by the solenoid coil must be greater than the resultant of all other forces tending to close the valve. This action also assumes that the magnetic force averaged over the power cycle must be less than the force shifting the valve plunger away from the closed position.

The pulsed solenoid control valve employed in the valve positioner of the present invention is, however, a normally open valve and is more fully illustrated and described in my copending application Ser. No. 487,537, filed Sept. 15, 1965. When used herein, the term "pulsed-solenoid" is understood to be the operation of a solenoid valve which is also capable of modulating control action by varying the voltage supplied to the coil of said control valve. The plunger is biased away from the closed position by a combination of spring forces, gravity and differential pressure forces. The magnetic force applied to the solenoid coil is designed to bias the valve plunger to the closed position. The pulsating current, therefore, is a direct current and of average magnitude which is sufficient to overcome the opening bias force. The minimum magnetic force, however, is less than the bias force and in this manner, the plunger is on the average held in the closed position; but vibration off of the valve seat is permitted by current reduction and negative control pulses to the solenoid coil.

The fluid supplied for the operation of the pulsed-solenoid control valve in the preferred embodiment is air which can be conveniently provided by any conventional source of air pressure. The air pressure is connected to the inlet port of the control valve through a fixed orifice. The fixed orifice or restriction is, in effect, in the upstream position with respect to the pulsed-solenoid control valve and thereby aids in creating an internal feedback or so-called "negative feedback" which materially improves flow stability of the control valve. The valve efficiency is increased under this force-balance principle and, therefore, the valve seat area should preferably be as large as possible. It can thus be seen that if the control valve itself was employed only as a flow control device, the effect of a pressure differential across the valve seat would be a detriment to operation since the set point of the valve would change with the differential pressure. However, a large differential pressure is desirable when the valve is used as a force balance device as herein provided, inasmuch as the effect operates to the advantage of the valve.

The pressure between the orifice and the control valve or the so-called "pilot pressure" is linearly related to the voltage input of the control circuit. This control pressure is transmitted to a diaphargm type relay which is, in turn, connected to a suitably controlled element such as an air motor. The relay includes an internal air chamber which is capable of communication with the air pressure chamber and an exhaust chamber. Furthermore, the chambers are separated by a movable plunger which sits in fixed restriction between each of the chambers. The relay also includes a control pressure chamber with a bellows or diaphragm internally disposed therein. Thus, as the control pressure increases, the diaphragm forces the plunger to close the exhaust chamber to the pressure chamber and open the pressure chamber to the air supply chamber. As a result thereof, air is supplied to the control element. If on the other hand, the control pressure is reduced, the diaphragm will permit the plunger to be spring-biased to the position where the exhaust chamber is open to the air pressure chamber and the air supply chamber is sealed to the air pressure chamber. Thus, it can be seen that the control pressure operates the relay in response to the changes of the voltage input to the control circuit. As the relay itself is operated in response to the changes of the control circuit, it can be seen that the control element itself is operated in response to changes in the controlled voltage.

By employment of the valve of the present invention, it can also be seen that the valve positioner will close in a fail-safe position in the event of a failure in air pressure. It can also be seen that the main valve will close in the fail-safe position in the event of power failure or of failure in the pilot valve. It is possible to have a main valve fail in the open position, as desired, by reversing the position of the fixed orifice with respect to the solenoid valve and placing the fixed orifice in the downstream position.

DETAILED DESCRIPTION

Figure 1:
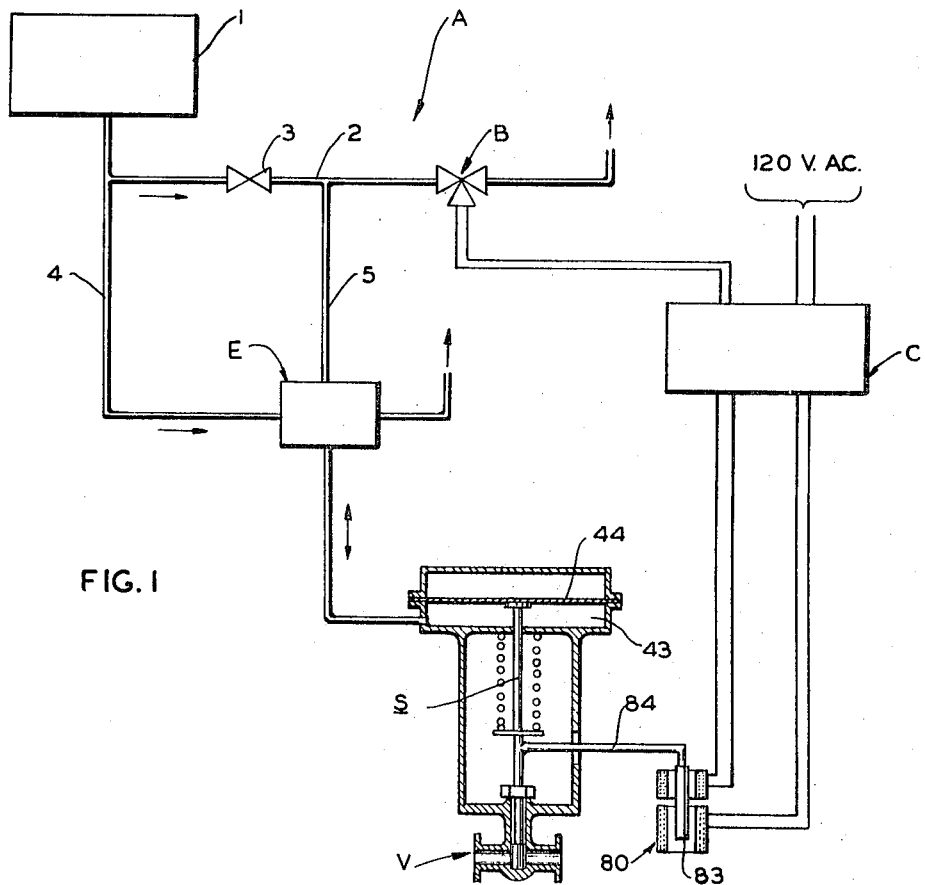
FIGURE 1 is a schematic view illustrating the various components and operative connections thereof forming the electropneumatic valve positioner of the present invention.

Referring now in more detail and by reference characters to the drawings, which illustrate a preferred embodiment of the present invention, A designates an electropneumatic valve positioner substantially as shown in the schematic illustration of FIGURE 1. The electropneumatic valve positioner A is comprised of various components in combination, each of which is hereinafter discussed in more detail. The valve positioner A generally comprises a pulsed-solenoid control valve B which is electrically connected to a control circuit C, the valve B being more fully illustrated in FIGURES 2 and 3 and the control circuit C being more fully illustrated in FIGURE 4 hereof. The pulsed-solenoid control valve B serves as a pilot valve and the inlet port of the valve B is connected to an air supply source 1 by means of an air supply line 2. A fixed restriction 3 is interposed between the air supply source 1 and the inlet port of the control valve B. An air supply line 4 is connected to the air supply source 1 and to an air relay E. Connected between the inlet port of the control valve B and the fixed restriction is a controlled pressure line 5 which is also connected to the relay E in the manner more fully described hereinafter. Each of the aforementioned components is hereinafter described and illustrated in more detail.

Figure 2:
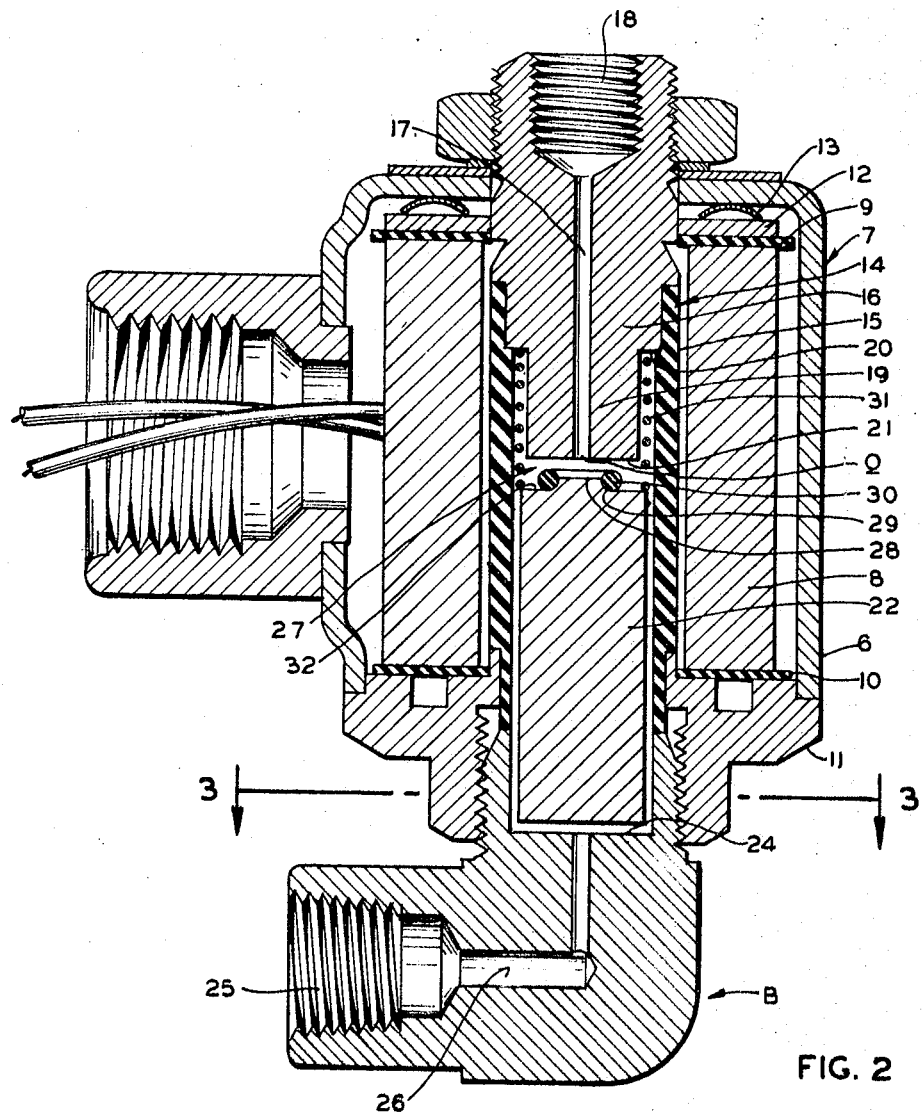
FIGURE 2 is a vertical sectional view, partially broken away, of an electrically operated control valve forming part of the electropneumatic valve positioner of FIGURE 1.
Figure 3:
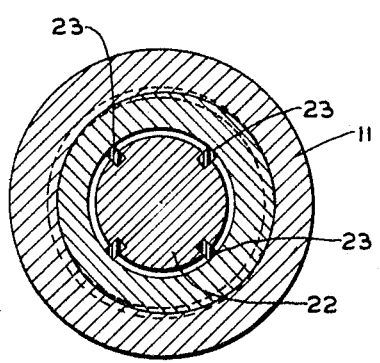
FIGURE 3 is a horizontal sectional view taken along line 3—3 of FIGURE 2.

The control valve B is more fully illustrated in FIGURES 2 and 3 and is substantially similar in operation to the pulsed solenoid control valve described in copending application Ser. No. 487,537, filed Sept. 15, 1965. Moreover, the theory of operation is set forth in my copending application Ser. No. 412,921, filed Nov. 23, 1964, entitled "Electrically Operated Control Valve," and of which the former application is a continuation-in-part application.

CONTROL VALVE

The control valve B generally comprises an outer control valve housing 6 including a somewhat cylindrical coil housing 7. Disposed within the housing 6 is a helically wound cylindrical solenoid coil 8 and disposed upon opposite ends thereof are upper and lower insulating washers 9 and 10, respectively. The insulating washer 9 is facewise disposed upon the upper surface of a base plate 11 which forms part of the outer coil housing 7. Facewise disposed upon the upper insulating washer 9 is a circular flux plate 12. The assembly of the solenoid coil 8, the insulating washers 9, 10 and the flux plate 12 is suitably held in place and urged downwardly toward the base plate 11 by means of a set of flat springs 13. By reference to FIGURE 2, it can be seen that the springs 13 are interposed between the upper surface of the flux plate 12 and the undersurface of the top wall forming part of the coil housing 7.

The coil housing 7 and the solenoid coil 8 are centrally apertured to accommodate a plunger tube assembly 14 which comprises a cylindrical tube 15 disposed axially within the coil housing 7 and which contains a central non-magnetic section surrounded by magnetic sections at each of the transverse ends. A cylindrical plug 16 is fitted in the upper end of the tube 15 and extends interiorly into the housing in the manner as shown in FIGURE 2. The plug is axially bored in the provision of a fluid inlet channel 17 which communicates with the interior of the cylindrical tube 15. The plug 16 is also integrally provided with an outwardly extending fitting 18 which is internally threaded to accommodate standard pipe fittings. The plug 16 is further diametrally reduced in the provision of a downwardly extending boss 19 forming an annular shoulder 20 for reasons which will presently more fully appear. The boss 19 is further provided with a relatively flat bottom face 21, which serves as an upper plunger stop. The air line 3, which serves as a fluid inlet channel opens into the tube 15 at the bottom face 21 in the form of an orifice O or seating surface.

Reciprocatively disposed within the tube 15 and being adapted for vibratory movement therein is a valve plunger 22, which is cylindrical in horizontal cross-section. The plunger 22 is slightly diametrally smaller than the tube 15 in order to permit fluid which flows into the interior of the tube 15 through the inlet port 17 to flow therearound. In order to prevent undue vibration of the valve plunger 22, the plunger is provided with four radially spaced axially extending flutes which are fitted with spacer strips 23 preferably formed of a tetrafluoroethylene polymer normally marketed under the trademark "Teflon." These strips 23 are spaced sufficiently from the interior of the wall of the tube 15 in order to permit axial vibratory movement of the plunger but prevent radial vibratory movement thereof. Furthermore, the plunger 22 may be sized to fit snugly but nevertheless shiftably within the tube 15 and may be provided with radially spaced axially extending fluid ducts as desired for permitting fluid flow. The valve plunger 22 is movable between the upper stop 21 and a lower stop 24 formed by a retaining plate secured to the lower end of the tube 15, in the manner as shown in FIGURE 2. The retaining plate 24 is suitably apertured to permit the fluid in the tube 15 to flow outwardly therefrom and into a standard fitting 25 having a discharge port 26. The pipe fitting 25 is internally threaded to accommodate standard pipes or similar fittings in the manner as shown in FIGURE 2. A valve seat 27 is formed on the upper end of the plunger 22 and includes an upstanding diametrally reduced boss 28 forming an annular shoulder 29. Rigidly fitted against the shoulder 29 is a seating ring 30, which is diametrally larger than the boss 28 and extends upwardly from the uppermost end of the valve plunger 22. The seating ring 30 is preferably formed of a suitable flexible plastic or rubber material such as polybutadiene rubber such as the type sold under the trademark "Buna-N." The valve plunger 22 may be biased downwardly by means of a compression spring 31 which bears against the shoulder 20 on the plug 16 and an upwardly presented shoulder 32 formed on the valve plunger 22.

In connection with the present invention, it should be understood that the spring 31 is not necessary, but may be employed as desired. The relative merits of employing a spring such as the spring 31 to bias the plunger downwardly is discussed hereinafter in detail. Furthermore, it should be recognized that the seating ring 30 must be formed of a fairly flexible material which is capable of forming an airtight seal around the orifice O on the flat bottom face 21.

In my aforementioned copending application Ser. No. 412,921, filed Nov. 23, 1964, which related to a normally closed pulsed-solenoid control valve, the control action is explained on the theory that the plunger is made to vibrate on an orifice by magnetic force and that the flow control results from controlling the amplitude of vibrations of the valve plunger. This concept permitted a quantitative description of the operable range of control and which was set forth in said application. In the normally closed valve, the two major conditions which must exist under the theory that flow control results from controlled vibration of a plunger is that the magnetic force generated by the solenoid coil must be greater than the combined spring and gravity forces which holds the plunger against the valve seat. The second condition is that the magnetic force averaged over the power cycle must be less than the force exerted by the spring.

The pulsed-solenoid control valve used in the present invention is a normally open device where the movable plunger is biased away from the seating face 21 by any combination of forces, such as by the spring 31, the force of gravity, or differential pressure forces. As previously indicated, the spring force is not necessary inasmuch as the gravity forces and differential pressure forces are sufficient downward components of force acting on the valve plunger 22. The magnetic force, which biases the valve plunger 22 toward the closed position, is generated by the pulsating DC current of average magnitude which is sufficient to overcome the opening bias force. However, the minimum magnetic force is less than this bias force. In this manner, the plunger is, on the average, held against the seat, but vibration off of the seat is permitted by the current reduction accompanying the so-called "negative pulses."

The magnetic force in the solenoid coil 8 nautrally must have a DC component which is large enough to hold the valve plunger 22 against the upper stop 21. When the flow-to-open pattern is selected, no bias spring is necessary to open the valve. With a large seat area, the force balance principle applied to the control valve produces, in effect, a "pop-off" valve, where the pop-off point can be controlled by controlling the electrical current to the coil. This action can be obtained with pulsation of current as in the case of the previously described normally closed pulsed-solenoid control valve or without pulsation of current. It is important that the seating ring 30 be sufficiently flexible to engage the seating surface 21, thereby preventing any fluid flow when the valve plunger 22 is moved to its uppermost position. However, the seating ring 30 must be sufficiently rigid to prevent a contact of the valve plunger 22 with any portion of the plug 16. In the case of the control valve of the present invention, it is possible to drop the current level below the critical firing level and not obtain any fluid flow. This phenomenon is due to the fact that there is not sufficient time for the relaxation of deformation of the valve seating ring 30. There is a balancing of the magnetic force against the differential pressure force across the valve. Accordingly, it can be seen that the valve plunger 22 does not have to vibrate. However, vibration is desirable in order to obtain an average of the force systems acting on the valve plunger 22 and thereby reduce any hysteresis problem. The hysteresis would exist from the seat deformation force and the magnetic memory which would be obtained when the valve plunger 22 is shifted to the closed or uppermost position. In fact if the magnetic force, which was equivalent to the square of the current to the coil 8, was plotted as a function of the differential pressure force across the valve, a single linear relation is achieved in the theoretical condition. However, in actual practice a hysteresis curve is produced. The employment of a "dither" or vibratory action on the valve plunger would average this hysteresis to produce a single linear relationship.

It can be seen that if the fixed orifice or fixed restriction 3 were placed in a downstream position with respect to the control valve B, the control valve B would serve as a direct acting electropneumatic transducer in that an increase in the voltage signal to the control circuit of the pulsed-solenoid control valve B will create a correspondingly linear increase in pressure on the downstream side of the control valve B.

RELAY

Figure 5:
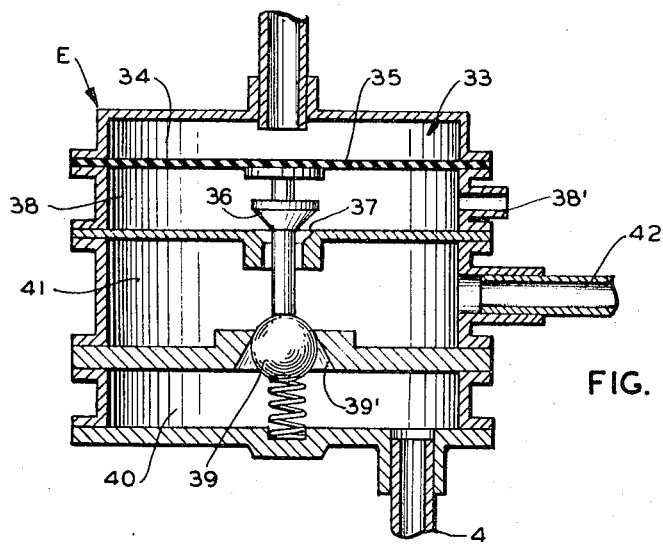
FIGURE 5 is a vertical sectional view, partially broken away, of a pneumatic relay forming part of the electropneumatic valve positioner of the present invention.

The relay forming part of the electropneumatic valve positioner of the present invention is more fully illustrated in FIGURE 5 and generally comprises an outer housing 33 having a pressure chamber 34 responsive to the upstream pressure from the pulsed solenoid control valve B and is connected thereto through the line 5. The pressure sensing chamber 34 operates a movable diaphragm 35, which is disposed thereacross and which, in turn, shifts a plunger 36, which is seatable in a so-called "valve seat" 37. The movable diaphragm 35, which is sensitive to pressure on the upstream side of the control valve B will vary the size of a leading chamber 38 and cause the relay to vent through a valve port 38'. The plunger 36 also moves a seating ball 39 from a valve seat 39'. As the seating ball 39 is moved away from its seating position in the seat 37, it will permit air from a high pressure chamber 40 to enter into an air supply chamber 41 for transmittal to a main control valve or so-called "air motor" V through an output pressure line 42. The high pressure chamber 40 is connected to the air supply 1 by means of the air pressure line 4 substantially as shown in FIGURE 1.

Referring again to FIGURE 5, it can be seen that when the pressure in the pressure sensing chamber 34 is reduced, the plunger 36 will be moved to its seated position, thereby preventing air from the high pressure chamber 40 to be transmitted to the main valve V. Air from the valve V will then be vented from the port 39. However, when the pressure in the pressure sensing chamber increases, the diaphragm 35 will expand causing the seating ball 39 to be moved out of seated position in the valve seat 39, thereby permitting air from the high pressure chamber 40 to enter into the chamber 41 and hence to the main valve V. It can be seen by reference to FIGURE 1 that the main valve V is provided with a valve stem s and which is movable responsive to the pressure in a chamber 43 formed within the main valve V. Disposed within the chamber 43 is a diaphragm 44 which is removable responsive to the pressure in the chamber 43. Moreover, the valve stem s is connected to the diaphragm 44 and is movable responsive thereto.

CONTROL CIRCUIT

Figure 4:
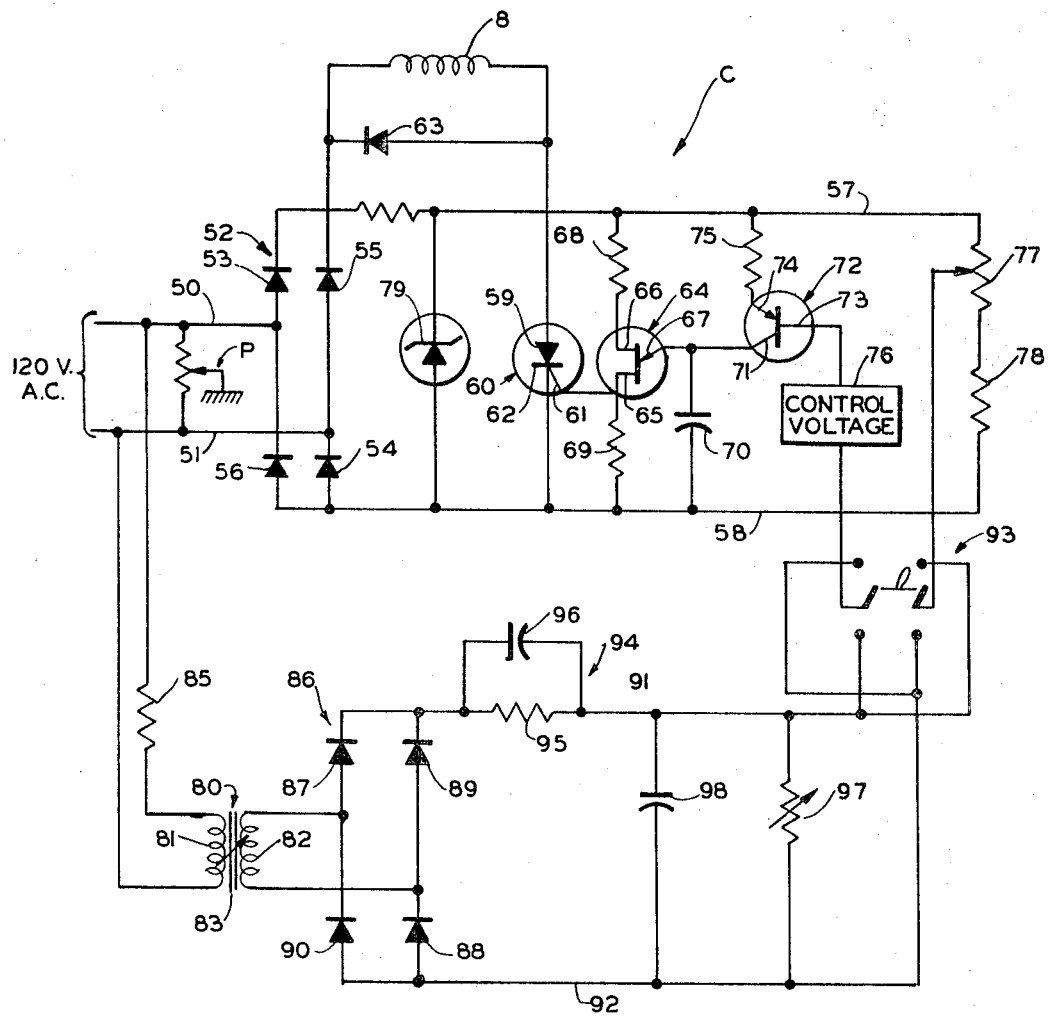
FIGURE 4 is a schematic view illustrating an electrical control circuit forming part of the electropneumatic valve positioner of the present invention.

The control circuit C, as schematically illustrated in FIGURE 4, is powered from a 120 volt source of alternating current (not shown) and includes a pair of conductors 50, 51 and which are, in turn, connected to a diode bridge 52 including diode sets 53, 54 and 55, 56. A balancing potentiometer P is connected across the conductors 50, 51 in the manner as shown in FIGURE 4. Connected to the opposite terminal of the diode bridge 52 is a B+ conductor 57 and a B— conductor 58.

One terminal of the solenoid coil 8 is connected to the common connection of the B+ conductor 57 and the diode bridge 52. The opposite terminal of the solenoid coil 8 is connected directly to an anode 59 of a silicon-controlled rectifier 60, which also includes a gate 61 and a cathode 62, the latter in turn being connected directly to the B— conductor 58. Connected across the solenoid coil 8 in a shunting relationship is a free-wheeling diode 63. If desired, a temperature compensating resistor, often termed thermistor (not shown), can be interposed between the silicon controlled rectifier 60 and the solenoid coil 8 to compensate for undesirable temperature effects. The firing angle of the basic voltage output of the control circuit C to the solenoid coil 8 is, of course, controlled by measured changes in a sensed physical variable. This change is measured in the form of a control voltage which is provided by any suitable electrical controller and is hereinafter discussed in more detail.

The basic timing device that controls the firing angle of the circuit in relation to the measured change in the physical variable is a unijunction transistor 64 which is provided with a base-1 65, a base-2 66 and an emitter 67. The base-2 66 is connected through a temperature compensating resistor 68 to the B+ conductor 57 and the base-1 65 is connected through a fixed resistor 69 to the B— conductor 58. The emitter 67 of the unijunction transistor 64 is connected to a capacitor 70, which is in turn connected to the B— conductor 58. The emitter 67 is also connected directly to a collector electrode or so-called "collector" 71 of a P-N-P transistor 72, the latter serving as a "degenerated common emitter" and including a base electrode or so-called "base" 73 and an emitter electrode or so-called "emitter" 74. The emitter electrode 74 is in turn connected through a high impedance resistor 75 to the B+ conductor 57. A surge suppressor (not shown) can also be connected across the B+ conductor 57 and the B— conductor 58, if desired, in order to suppress any transient voltage.

As indicated above, the firing angle of the basic voltage output of the control circuit C is controlled by the change in the measured physical variable. This change is measured in the form of a control voltage which is provided by a suitable electrical controller and is designated as a "control voltage source" 76 and which is connected in series with the feedback voltage from the secondary circuit in the manner illustrated in FIGURE 5. The opposite terminal of the control voltage source 76 is connected to a setpoint potentiometer 77, which is in turn connected to one terminal of the B+ conductor 57 and through a fixed resistor 78 to the B— conductor 58. Also connected across the B+ conductor 57 and the B— conductor 58 is a Zener diode 79.

The control circuit C includes a variable transformer 80 having a primary coil 81 and a secondary coil 82 with a movable core 83. By reference to FIGURE 1, it can be seen that the movable core 83 is connected directly to the valve stem S by means of a connecting rod 84 and is movable therewith. Again referring to FIGURE 4, it can be seen that the primary coil 81 is connected across the positive connector 50 and the neutral conductor 51. Moreover, interposed between the positive conductor 50 and one terminal of the primary coil 81 is a dropping resistor 85.

The secondary coil 82 is connected across a diode bridge 86 or so-called "quad rectifier" including diode sets 87, 88 and 89, 90. The diode bridge 86 is connected across a pair of conductors 91, 92, which are connected directly to a sense switch 93 and which is, in turn, connected to the voltage source 76. The sense switch 93 is provided for producing sense inversion in the control circuit C. Interposed in the conductor 91 is a rate action generator 94 consisting of a fixed resistor 95 shunted by a capacitor 96, substantially as shown in FIGURE 4. Also connected across the conductors 91, 92, and thereby across the secondary coil 82 is a gain potentiometer 97, and similarly connected across the conductors 91, 92 in parallel with the gain potentiometer 97 is a capacitor 98.

OPERATION OF THE CONTROL CIRCUIT

In order to describe the operation of the control circuit, it must be recognized that the control voltage source 76 is representative of the function which is being measured. It should, therefore, be understood that the control voltage source 76 can be conveniently replaced by a suitable sensory mechanism for measuring the changes of a physical variable which is capable of being converted into voltage changes. Consequently, it can be seen that the basic firing angle of the output voltage in the solenoid 8 is controlled by the changes in the sensed physical variable. Inasmuch as the sensed change of the physical variable is capable of being translated to an electrical change, such as a voltage or current change, this change can be physically represented by the control voltage source 76. However, it should be understood that no particular type of control voltage source is herein illustrated or described, inasmuch as the valve positioner of the present invention can be used with any type of electrical controller capable of generating current or voltage changes. The electro-pneumatic valve positioner herein is illustrated as being operatively connected to a conventional air motor type of controlled valve in order to correct signals to the air motor.

As the position of the valve stem s in the controlled valve V changes, the movable core 83 will also shift between the primary coil 81 and the secondary coil 82. The amount of shift and location of the movable core 83 will generate a secondary voltage in the secondary coil 82. Obviously, the position of the core 83 will determine the size of the voltage induction in the secondary coil 82. The voltage induced in the coil 82 would normally be an alternating current voltage which is rectified by the diode bridge 86 to obtain a full wave DC current. The rate action generator 94 consisting of the fixed resistor 95 and the capacitor 96 will provide a lead action and, in effect, anticipates the fixed position of the main valve stem s at its equilibrium position. This anticipation of fixed position and equilibrium tends to reduce the error signal created by the induction of voltage in the coil 82 and prevents an overshoot. By adjusting the gain potentiometer 97, it is possible to reduce the effective voltage of the variable transformer 80. If the gain potentiometer voltage approached zero, there would be no feedback voltage and if the resistance of the gain potentiometer 97 was infinite, the voltage from the secondary coil 82 would be at a maximum value. The position signal will lag which could create oscillation of the control valve B. The gain potentiometer 97 tends to eliminate this instability by reducing the gain to a point below where oscillation of the control valve will no longer exist.

The primary circuit of the present invention also differs from the circuit described in my copending application Ser. No. 487,537 filed Sept. 15, 1965, in that this circuit employs a full-wave DC current, whereas in the aforementioned application, a half-wave current was employed which would flow through the load in the same direction at all times. The circuit of the present invention only employs a single silicon controlled rectifier and, therefore, the diode bridge 52, which serves as a rectifier, is employed. The current from the source of electrical current, which is generally a Sola 120 volt AC current transformer flows through the various diode pairs 53, 54, 55 and 56 depending on whether the pairs are positive or negative. Thus, current will flow through the conductor 50 to the diode 53, through the load or solenoid coil 8 and the silicon controlled rectifier 60, when the latter is conducting. Current will flow back through the silicon controlled rectifier 60, through the diode 54 and the conductor 51. However on reversal, current will flow in through the conductor 51, through the diode 55 and the solenoid coil 8, when the silicon controlled rectifier 60 is conducting. Current will thereafter flow from the silicon controlled rectifier 60 through the diode 56 into the conductor 50.

The signal which is generated by the movement of the core 83 within the variable transformer 80 is then transmitted to the degenerated common emitter transistor 72 which is designed to convert the voltage to a current signal with a very high impedance so that the current through the degenerated common emitter transistor 70 passes through the collector 71 thereof. In normal operation, the transistor 72 would be controlled by the voltage within the voltage source 76, the feedback voltage and the setpoint voltage. The collector 71 of the transistor 72 has a high impedance and the current passes through the collector 71 to the capacitor 70. In essence, therefore, the voltage across the transistor 70 merely controls the collector current inasmuch as the current will pass through the collector 71. Moreover, the size of the resistor 75 will determine the current across the transistor 72. The current passing through the collector 71 will charge the capacitor 70 until the capacitor 70 reaches its saturation point. Consequently, it can be seen that a constant current application is maintained on the unijunction transistor 64. Similarly, the transistor 72 is designed to provide a constant current source regardless of the load maintained thereon, or of the voltage level, because of the high source impedance.

The unijunction transistor 64, which serves as the relaxation oscillator delivers a current pulse from the base-1 65 thereof into the base 61 of the silicon controlled rectifier 60 at a controllable time in the cycle of the supply voltage from the source of electric current. When the silicon controlled rectifier 60 receives a signal, it will begin to conduct and will continue to conduct until the current attempts to reverse, at which time conventional diode action stops the current flow. However, current flow to the unijunction transistor 64 will continue from the capacitor 70. The operation of the relaxation oscillator uses the principle of the unijunction transistor 64 that conduction between the emitter 67 and base-1 65 is prevented unless the emitter-to-base-1 voltage is greater than a critical value, that critical value being determined by the base-2 voltage to the base-1 voltage. When this peak voltage is exceeded, the effective resistance between the emitter 67 and the base-1 drops and approaches a zero level. Conduction should normally continue until the emitter-to-base-1 voltage drops below the valley point voltage.

The control voltage source 76, the feedback voltage, and the set point of the set point potentiometer 77 determines the firing time of the unijunction transistor 64 and synchronization with the supply of alternating current is obtained by feeding the base-2 66 with the same signal. The transistor 72 in combination with the capacitor 70 thus provides a constant current source, the size of the current being determined by the control voltage applied to the transistor 72.

If the unijunction transistor 64 is in a conductive state, current flow will be maintained from the collector 71 of the transistor 72 to the emitter 67 of the unijunction transistor 64. If the unijunction transistor 64 is in a non-conductive state, that is, it is not firing, the constant current flow from the degenerated common emitter transistor 72 will charge the capacitor 70. When the unijunction transistor 64 is rendered conductive, the capacitor 70 will discharge to the emitter 67 of the unijunction transistor 64. The maximum steady state current in the unijunction transistor 64 must be less than the valley point current. The emitter 67 is back-biased generally until there is sufficient voltage build-up across the emitter 67. However, during the time of the voltage rise at the emitter 67, the voltage difference maintained between the base-1 65 and the base-2 66 will be constant. When the voltage at the emitter 67 reaches its critical value, the unijunction transistor 64 will fire, thereby discharging the capacitor 70 through the resistor 69, permitting current flow into the gate 62 of the silicon controlled rectifier 66.

This pulse of current to the gate 62 of the silicon controlled rectifier 60 will cause the rectifier 60 to fire and to begin to supply current to the solenoid coil 8. When the control current is less than the critical value, the capacitor 70 will not have charged to the firing voltage by the end of the positive cycle. After the unijunction transistor 64 has fired, the capacitor 70 will immediately begin to recharge, and if the current is high enough, it may fire again before the end of the next cycle. However, since the silicon controlled rectifier 60 will already be in the conducting state, this additional pulse caused by the firing of the capacitor 70 will have no effect.

In the electrical circuits which employ a resistive load, there is generally a long quiescent period between current pulses. It is known that in an inductive load, the current always lags the voltage so that the voltage may go to zero but the current will still be flowing through the silicon controlled rectifier and consequently, the silicon controlled rectifier cannot turn off. In the case where there is the inductive load, the current may drop but the next voltage pulse is sufficiently close so that the silicon controlled rectifier will remain in the conducting condition.

The employment of the free-wheeling diode 63 overcomes this problem. When the current is discontinued to the silicon controlled rectifier 60, it will flow through a circuitous path from the solenoid coil 8 to the free-wheeling diode 63. This condition will occur when the voltage at the silicon controlled rectifier is sufficiently high so that the rectifier may turn off. As this occurs, it will achieve an inductive decay substantially as illustrated in my copending application Ser. No. 487,537, filed Sept. 15, 1965. It is to be noted that the current never goes to zero and reaches a slightly higher minimum value until a steady state equilibrium is achieved. Consequently, there is a minimum and maximum current level. It can also be seen that there is a critical voltage at which the silicon controlled rectifier 60 will fire.

It can be seen that the half-wave silicon controlled rectifier power supply used with the pulsed solenoid control valve described in my copending application Ser. No. 412,921, filed Nov. 23, 1964, would not permit the reverse mode of operation as employed herein. As indicated above, this was due to the long period of the negative half-cycle in which no magnetic force is generated, thus permitting the valve to move to the open position. The full-wave direct current silicon controlled rectifier power supply therefore overcomes this problem. In the present circuit, the maximum magnetic force is generated shortly after the firing of the silicon controlled rectifier which occurs two times in every cycle of the supply voltage. Following the silicon controlled rectifier firing, the current reaches a maximum and begins to decline up to the point where the voltage across the solenoid coil reverses. At this time, the free-wheeling diode will divert the coil current from the silicon controlled rectifier allowing it to commutate and the coil current is dissipated by a current-resistance drop in the coil. This inductive decay continues until the next firing of the silicon controlled rectifier when the cycle again repeats itself. The amplitude of vibration of the plunger can be increased by decreasing the minimum value of the current or by increasing the time the current is lower than the critical zero vibration current.

THEORY OF OPERATION

A detailed discussion of the pulsed solenoid control action and of the operation of the valve B in the present electropneumatic valve positioner is provided in copending application Ser. No. 487,537, filed Sept. 15, 1965. Some of the basic theory of the operation of the valve was hereinabove provided for the explanation of operation of the valve positioner in the present invention.

From the circuit described in FIGURE 4, it can be seen that a decrease of the firing angle of the silicon controlled rectifier 60 increases the effective opening of the pulsed solenoid control valve B and thereby increases the output pressure of the relay E to the air motor. This increase in pressure causes the air motor or so-called main valve V to open. As the main valve V opens, the feedback voltage is thereby decreased and this resulting decrease in the firing angle of the silicon controlled rectifier 60. Thus, it can be seen that a stable situation exists in which the feedback voltage provides just a sufficient amount of pilot flow to hold the main valve V in the preset position. It can also be seen that as the resistance in the gain potentiometer 97 is increased, the system becomes more independent of air flow conditions and, therefore, more independent on the loading of the valve V. Thus at a sufficiently high gain, a fixed position of the reset potentiometer 77 corresponds to a fixed position of the valve stem s of the main valve V. It can be seen that an electrical signal to the control circuit C will position the stem s of the valve V by means of a fluid power source.

By reference to FIGURE 1, it can be seen that if the air line to the diaphragm of the main valve was opened or if the valve positioner was maintained in an open loop condition, the steady state position of the valve stem s of the main valve V would not change position. In the closed loop circuit of FIGURE 1, air pressure will be fed to the underside of the diaphragm in the main valve V when the control valve B is closed. The initial position of the valve stem s is determined by the instrument signal which is the voltage signal. For purposes of illustration of the present invention, a changing of the reset potentiometer 75 would be a simulation of a change in instrument signal. If the position of the valve stem s is too low for the reset potentiometer setting, the pulsed solenoid control valve B will have a tendency to close. This will, in turn, create pressure on the diaphragm of the relay E, thereby opening the air supply valve in the relay E. Consequently, air will be supplied to the underside of the diaphragm in the main valve V. Application of air to the diaphragm will cause the main valve stem s to lift.

The shifting of the main valve stem s moves the core 83 between the primary and secondary coils 81, 82 of the transformer 80 which serves as a sensor. In essence, the transformer 80 is designed to sense the change of position of the valve stem s. If the valve stem s lifts its relative position with regard to the secondary coil 82, a reduced signal is supplied to the control circuit C. This reduced signal tends to open the pulsed solenoid control valve B in a manner hereinafter described. In essence, the control circuit compares the fixed voltage maintained by the reset potentiometer 77 with the comparative voltage of the transducer or variable transformer 80.

If the position of the main valve stem s is too high with respect to the position of the reset potentiometer 77, which is a simulation of an instrument signal, the pulsed solenoid control valve B tends to open. When the pulsed solenoid valve B is open, it will vent the fluid from the air source thereby reducing the pressure on the diaphragm of the relay E. As this occurs, the pressure to the main valve V will be reduced and vented to the atmosphere. As a result thereof, pressure bleeds from the underside of the diaphragm in the main control valve V thereby permitting the valve stem s to move to a lower position. As the valve stem s moves to a lower position, the signal to the control circuit C increases as a result of the displacement of the movable core 83 and the variable transformer 80. Thise signal has the counterbalancing effect which tends to close the pulsed solenoid control valve B. Thus, through the balancing effect of the reduced pressure on the main valve diaphragm and the changing of the orifice in the control valve B pursuant to the changed control signal, the valve stem s achieves a new equilibrium position which is proportional to the change on the reset potentiometer 77. It can thus be seen that the operation of the valve positioner is based upon a balancing of a feedback voltage against a set-joint voltage.

When the gain is too high to accomplish the above objective, the system will oscillate due to lags associated with the volumes of the main valve V and the volume of the control pressure system. This is corrected by the introduction of the leading signal accomplished by the control rate generator 94. The purpose of the lead action is to anticipate the eventual steady-state requirements before the valve V achieves the set position.

From the above, it can be seen that the electropneumatic valve positioner of the present invention eliminates the mechanical linkages which were necessary in the valve positioners of the prior art. Accordingly, it is no longer necessary to use the so-called "flapper" valve to provide a variable orifice. The pulsed solenoid flow control action of the electropneumatic valve positioner A now makes it possible to perform this function with an electric signal. As a result thereof, the inevitable backlash, dead zone and hysteresis normally found in the valve positioners of the prior art has been completely eliminated. The fast response of pulsed solenoid control action also provides high speed operation. The electrical feedback circuit used in the present valve positioner makes it easy to generate action needed to stabilize the system. This is accomplished by adjustment of the resistor 95 and capacitor 96. Adjustment of the gain potentiometer 97 makes it possible to critically damp the system thereby obtaining high gain and excellent dynamic response.

The present valve positioner can be sized for use with any size control valve. The circuit is adapted to accept voltage, current or digital input signals. Moreover, the unequaled accuracy of this particular system makes the electropneumatic valve positioner attractive for direct digital control applications where superior valve performance is required.

The construction of this type of electropneumatic valve positioner allows the entire system to fail in the same direction on failure of either electrical power or failure on the pulsed soelnoid valve seat. Experimental data on this reverse acting type of pulsed solenoid control valve has also confirmed that seat wear is essentially unmeasurable and the valve positioner is characterized by mechanical simplicity. Moreover, with the present valve positioner, it is possible to change the calibration of the valve positioner without affecting the loop gain.

EXAMPLE

The invention is further illustrated by, but not limited to, the following example:

An electropneumatic valve positioner was constructed in accordance with the present invention by employing a conventional air supply source with a conventional pressure regulator designed to provide constant downstream air pressure of 20 p.s.i.g. The constant downstream air pressure line was also connected to a Foxboro 40D air relay which was, in turn, pneumatically connected to a conventional air motor. Also connected to the constant air pressure line was a pulsed solenoid control valve of the type described herein.

The control valve B, which was employed in the valve positioner, was a modified form of a Hoke S90A320CT solenoid valve which had the following specifications:

| | |
|---|---|
| Plunger weight _____gms__ | 20 |
| Plunger outer diameter _____cms__ | 1.10 |
| Effective axial plunger length _____cms__ | 3.0 |
| Outer shell, outer diameter of plunger ____cms__ | 4.1 |
| Outer shell thickness _____cms__ | 0.159 |
| Orifice diameter _____inch__ | 0.125 |
| Air gap when plunger seated _____cms__ | 0.125 |

The solenoid coil of the control valve is characterized by the following data.

Total coil turns _____ 4000
DC resistance (including compensator
  resistors) _____ohms__ 265
Wire size _____ga__ 33
Coil inner diameter _____cm__ 1.35
Coil outer diameter _____cm__ 2.98
Coil height _____cm__ 3.15

The valve had an all stainless steel construction formed of Type 430F stainless steel with an initial permeability of 200, a maximum permeability of 1400, and a saturation flux density of 14,000 grams. The orifice seating surface was relatively flat and had an overall area of 0.205" x 0.185". The orifice had an outer diameter of 0.0245". The upper end of the plunger was milled to a relatively flat surface and drilled to form a flat-bottomed hole of approximately 0.245" diameter with a depth of 0.065". Fixedly disposed within the hole formed in the upper end of the plunger was a rubber sealing O ring formed of butadiene acrylonitrile (Buna-N rubber). Additionally, Teflon tubing with an outer diameter of 0.065" was fitted into each of the four flutes formed in the valve plunger and which served as radial guides, thereby eliminating friction and reducing unwanted radial vibrations.

The valve was next connected to a control circuit which was constructed in conformance with FIGURE 4 with the following parts.

| Part | Reference numeral | Specifications |
|---|---|---|
| Primary circuit: | | |
| Resistor | 57 | 100K ohms. |
| Do | 68 | 2.2K ohms. |
| Do | 69 | 47 ohms. |
| Do | 75 | 10K ohms. |
| Do | 78 | 50K ohms. |
| Do | | 3.5K ohms. |
| Potentiometer | 77 | 10K ohms, 10 turn. |
| Capacitor | 70 | 0.1 mfd., 200 volts. |
| Diode | 53 | 1N1695. |
| Do | 54 | 1N1695. |
| Do | 55 | 1N1695. |
| Do | 56 | 1N1695. |
| Do | 63 | 1N1695. |
| PNP transistor | 72 | 2N3250. |
| Unijunction transistor | 64 | 2N1671. |
| Silicon controlled rectifier | 60 | 2N1597. |
| Zener diode | 79 | 1N1779, 22 volts. |
| Constant voltage transformer | | Sola Cat. No. 23-13-060, 120 volts AC. |
| Secondary circuit: | | |
| Resistor | 85 | 6.3K ohms, 3 watts. |
| Do | 95 | 8.3K ohms. |
| Potentiometer | 97 | 5K ohms. |
| Capacitor | 98 | 5 mfd., 25 volts. |
| Diode | 87 | Motorola Quad 200 PIV. |
| Do | 88 | Do. |
| Do | 89 | Do. |
| Do | 90 | Do. |
| Transformer | 80 | 12 volts (root mean square). |

Resistors: in ohms, ½W unless specified.

The flow characteristics of the control valve A were determined at a constant inlet pressure and the flow rate was determined as a function of the potentiometer setting for two different pressure differentials across the valve. The first pressure differential was 5 p.s.i.g. and the second differential employed was 20 p.s.i.g. The potentiometer setting, which is directly related to the voltage in microvolts was plotted as a function of the flow rate which is logarithmic. The curve which illustrates this flow characteristic of the valve is set forth in my copending application Ser. No. 487,537, filed Sept. 15, 1965.

The basic accuracy of this electropneumatic valve positioner was tested with a Foxboro air-to-lift motor or so-called main valve with a 6¾" diameter. The fixed orifice was formed in a capillary tube with a diameter of 0.010". A 5 p.s.i.g. set point was used on the relay with a relay gain of 14. At this position, flow noise was undetectable.

FIGURE 6 set forth a plot of the potentiometer setting (which is proportional to control voltage) as a function of the main valve stem lift in inches, which provides the valve positioner characteristics. Hysteresis along this curve was determined to be less than 0.0002". Moreover, the characteristics of the electropneumatic valve positioner as a transducer are shown in FIGURE 7. The excellent linearity of the valve positioner is well illustrated by the curve plotted in FIGURE 7. Moreover, it is believed that the valve positioner characteristics as set forth herein are excellent inasmuch as the main valve had a 3% deadband due to friction so that the valve positioner of the present invention would provide even superior results with a main valve having a lower percentage of deadband.

The electropneumatic valve positioner of the present invention was compared with a conventional commercially available valve positioner with a pneumatic set point. The results of this comparison are set forth in the following table:

TABLE.—VALVE POSITIONER CHARACTERISTICS

| | Electropneumatic valve positioner | Conventional valve positioner |
|---|---|---|
| Open loop gain | 70 | 130 |
| Repeatability, percent of full scale | 0.04 | 0.08 |
| Hysteresis, percent of full scale | 0.06 | 0.60 |
| Deadband, percent of full scale | 0.06 | 0.60 |
| Linearity, percent of full scale | 1 | 1 |
| Stroking time, sec. for full scale | 0.6 | 0.6 |
| Overshoot on step change, percent | 4 | 6 |
| Estimated frequency response, c.p.s. | 5-10 | |
| Effect of air supply pressure, percent/p.s.i. | ±.03 | +.16 |

The 0.6% offset of the present electropneumatic valve positioner appears to be limited only by loop gain. An unexpected advantage of this electropneumatic valve positioner was the almost unmeasurable effect of air supply pressure on the position attained. Thus, it is possible to eliminate the air set required with the commercially available valve positioners.

It should be understood that changes and modifications in the form, construction, arrangement and combination of parts presently described and pointed out may be made and substituted for those herein shown without departing from the nature and principle of my invention.

Having thus described my invention, what I desire to claim and secure by Letters Patent is:

1. An electropneumatic positioning system for positioning the movable element of a device which is dynamically operable in response to a control signal; said positioning system comprising in combination a fluid supply source, a pulsed-solenoid operated control valve having a valve seat and a dithering valve plunger which vibrates with respect to said valve seat to control flow, said valve being operatively connected to said fluid supply source, control means operatively connected to said control valve for initiating electrical pulse signals to cause a dithering action of said plunger and to regulate the quantity of fluid passing through said valve in relation to the electrical pulse signals from said control means, said valve plunger being normally biased away from said valve seat by a force including gravitational force and being urged toward said seat upon initiation of each electrical pulse signal, sensing means operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said pulse signal and balancing said signals to establish equilibrium conditions, and means in said control means for regulating said pulse signals to control the lift-time history of said valve plunger by causing repetitive cycles of an opening period, a closing period and a quiescent period, thereby preventing said plunger from contacting its upper limit of travel and enabling said plunger to engage said valve seat in a condition of dynamic rest on each said pulse signal during the vibratory action to regulate the fluid supplied to said device in response to said position signal, whereby fluid is admitted to said device to bias said movable element in such direction so that a change in signal of the sensing means would tend to initiate opposite action.

2. An electropneumatic positioning system for positioning the movable element of a device which is dynamically operable in response to a control signal; said positioning system comprising in combination a fluid supply source, a pulsed-solenoid operated control valve having a valve seat and a dithering valve plunger which vibrates with respect to said valve seat to control flow, said valve being operatively connected to said fluid supply source, control means operatively connected to said control valve for initiating electrical pulse signals to cause a dithering action of said plunger and to regulate the quantity of fluid passing through said valve in relation to the electrical pulse signals from said control means, said valve plunger being normally biased away from said valve seat by a force including gravitational force and being urged toward said seat upon initiation of each electrical pulse signal, sensing means operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said pulse signal and balancing said signals to establish equilibrium conditions, means in said control means for regulating said pulse signals to control the lift-time history of said valve plunger by causing repetitive cycles of an opening period, a closing period and a quiescent period, thereby preventing said plunger from contacting its upper limit of travel and enabling said plunger to engage said valve seat in a condition of dynamic rest on each said pulse signal during the vibratory action to regulate the fluid supplied to said device in response to said position signal, whereby fluid is admitted to said device to bias said movable element in such direction so that a change in signal of the sensing means would tend to initiate opposite action, and relay means pneumatically interposed between said dynamically operable device and said control valve and being actuable responsive to the quantity of fluid flowing through said control valve.

3. An electropneumatic positioning system for positioning the movable element of a device which is dynamically operable in response to a control signal; said positioning system comprising in combination a fluid supply source, a pulsed-solenoid operated control valve having a valve seat and a dithering valve plunger which vibrates with respect to said valve seat to control flow, said valve being operatively connected to said fluid supply source, control means operatively connected to said control valve for initiating electrical pulse signals to cause a dithering action of said plunger and to regulate the quantity of fluid passing through said valve in relation to the electrical pulse signals from said control means, said valve plunger being normally biased away from said valve seat by a force including gravitational force and being urged toward said seat upon initiation of each electrical pulse signal, sensing means operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said pulse signal and balancing said signals to establish equilibrium conditions, means in said control means for regulating said pulse signals to control the lift-time history of said valve plunger by causing repetitive cycles of an opening period, a closing period and a quiescent period, thereby preventing said plunger from contacting its upper limit of travel and enabling said plunger to engage said valve seat in a condition of dynamic rest on each said pulse signal during the vibratory action to regulate the fluid supplied to said device in response to said position signal, whereby fluid is admitted to said device to bias said movable element in such direction so that a change in signal of the sensing means would tend to initiate opposite action, fixed orifice means pneumatically interposed between said dynamically operable device and said control valve for creating a negative feedback condition across said control valve and stabilizing the operation of said control valve, and relay means pneumatically interposed between said dynamically operable device and said control valve and being actuable responsive to the quantity of fluid flowing through said valve.

4. An electropneumatic positioning system for positioning the movable element of a device which is dynamically operable in response to a control signal; said positioning system comprising in combination a fluid supply source, a pulsed-solenoid operated control valve having a valve seat and a dithering valve plunger which vibrates with respect to said valve seat to control flow, said valve being operatively connected to said fluid supply source, control means operatively connected to said control valve for initiating electrical pulse signals to cause a dithering action of said plunger and to regulate the quantity of fluid passing through said valve in relation to the electrical pulse signals from said control means, said valve plunger being normally biased away from said valve seat by a force including gravitational force and being urged toward said seat upon initiation of each electrical pulse signal, sensing means including a variable transformer operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said pulse signal and balancing said signals to establish equilibrium conditions, and means in said control means for regulating said pulse signals to control the lift-time history of said valve plunger by causing repetitive cycles of an opening period, a closing period and a quiescent period, thereby preventing said plunger from contacting its upper limit of travel and enabling said plunger to engage said valve seat in a condition of dynamic rest on each said pulse signal during the vibratory action to regulate the fluid supplied to said device in response to said position signal, whereby fluid is admitted to said device to bias said movable element in such direction so that a change in signal of the sensing means would tend to initiate opposite action.

5. An electropneumatic positioning system for positioning the movable element of a device which is dynamically operable in response to a control signal; said positioning system comprising in combination a fluid supply source, a pulsed-solenoid operated control valve having a valve seat and dithering valve plunger which vibrates with respect to said valve seat control flow, said valve being operatively connected to said fluid supply source, control means operatively connected to said control valve for initiating electrical pulse signals to cause a dithering action of said plunger and to regulate the quantity of fluid passing through said valve in relation to the electrical pulse signals from said control means, said valve plunger being normally biased away from said valve seat by a force including gravitational force and being urged toward said seat upon initiation of each electrical pulse signal, sensing means operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position singal to said control means, summing means operatively associated with said control means for comparing the position signal with said pulse signal and balancing said signals to establish equilibrium conditions, means in said control means for regulating said pulse signals to control the lift-time history of said valve plunger by causing repetitive cycles of an opening period, a closing period and a quiescent period, thereby preventing said plunger from contacting its upper limit of travel and enabling said plunger to engage said valve seat in a condition of dynamic rest on each said pulse signal during the vibratory action to regulate the fluid supplied to said device in response to said position signal, whereby fluid is admitted to said device to bias said movable element in such direction so that a change in signal of the sensing means would tend to initiate opposite action, and rate generating means operatively connected to said control means for creating an electrical lead action to anticipate a steady state equilibrium position thereby stabilizing the control means.

6. An electropneumatic positioning system for positioning the movable element of a device which is dynamically operable in response to a control signal; said positioning system comprising in combination a fluid supply source, a pulsed-solenoid operated control valve having a valve seat and a dithering valve plunger which vibrates with respect to said valve seat to control flow, said valve being operatively connected to said fluid supply source, control means operatively connected to said control valve for initiating electrical pulse signals to cause a dithering action of said plunger and to regulate the quantity of fluid passing through said valve in relation to the electrical pulse signals from said control means, said valve plunger being normally biased away from said valve seat by a force including gravitational force and being urged toward said seat upon initiation of each electrical pulse signal, sensing means operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said pulse signal and balancing said signals to establish equilibrium conditions, means in said control means for regulating said pulse signals to control the lift-time history of said valve plunger by causing repetitive cycles of an opening period, a closing period and a quiescent period, thereby preventing said plunger from contacting its upper limit of travel and enabling said plunger to engage said valve seat in a condition of dynamic rest on each said pulse signal during the vibratory action to regulate the fluid supplied to said device in response to said position signal, whereby fluid is admitted to said device to bias said movable element in such direction so that a change in signal of the sensing means would tend to initiate opposite action, and means for adjusting the loop gain of said control means to prevent oscillation in the positioning system.

7. The electropneumatic positioner according to claim 1, characterized by the fact that the solenoid operated pilot valve is opened in the energized condition.

8. The electropneumatic positioner according to claim 1, characterized by the fact that the solenoid operated pilot valve uses a pressure signal generated between the pilot valve and a fixed restriction to actuate the movable element of the dynamically operable device.

9. The electropneumatic positioner according to claim 1, characterized by the fact that the control means comprises a control circuit including a rate action generator which anticipates the desired position of the movable element for providing a lead action for the position signal produced by the sensing means.

10. An electropneumatic positioning system for positioning the movable element of a device which is dynamically operable in response to a control signal; said positioning system comprising in combination a fluid supply source, a pulsed-solenoid operated control valve having a valve seat and a dithering valve plunger which vibrates with respect to said valve seat to control flow, said valve being operatively connected to said fluid supply source, control means operatively connected to said control valve for initiating electrical pulse signals to cause a dithering action of said plunger and to regulate the quantity of fluid passing through said valve in relation to the electrical pulse signals from said control means, sensing means including a variable transformer operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said means, summing means operatively associated with said control means for comparing the position signal with said pulse signal and balancing said signals to establish equilibrium condtions, means in said control means for regulating said pulse signals to control the lift-time history of said valve plunger by causing repetitive cycles of an opening period, a closing period and a quiescent period, thereby preventing said plunger from contacting its upper limit of travel and enabling said plunger to engage said valve seat in a condition of dynamic rest on each said pulse signal during the vibratory action to regulate the fluid supplied to said device, whereby fluid is admitted to said device to bias said movable element in such direction so that a change in signal of the sensing means would tend to initiate opposite action, fixed orifice means pneumatically interposed between said dynamically operable device and said control valve for creating a negative feedback condition across said control valve and stabilizing the operation of said control valve, relay means pneumatically interposed between said dynamically operable device and said control valve and being actuable responsive to the quantity of fluid flowing through said valve, rate generating means operatively connected to said control means for creating an electrical lead action to anticipate a steady state equilibrium position thereby stabilizing the control means, and means for adjusting the loop gain of said control means to prevent oscillation in the positioning system.

11. In a valve positioning system a dithering valve.

12. An electropneumatic positioning system for positioning the movable element of a device which is dynamically operable in response to a control signal; said positioning system comprising in combination a fluid supply source, a pulsed-solenoid operated control valve having a solenoid, a valve seat and a dithering valve plunger which vibrates with respect to said valve seat to control flow, said valve being operatively connected to said fluid supply source, control means operatively connected to said control valve for transmitting a current signal to the solenoid of said valve and initiating a magnetically generated force to cause a dithering action of said plunger and to regulate the quantity of fluid passing through said valve in relation to the current signal from said control means, said valve plunger being normally biased away from said valve seat by a force including gravitational force and being urged toward said seat upon initiation of each electrical pulse signal, sensing means operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said current signal and balancing said signals to establish equilibrium conditions, and means in said control means for controlling the lift-time history of said plunger to cause a repetitive cycle of said plunger including an opening period, a closing period and a quiescent period, such that during the opening period the plunger never contacts its uppermost limit of travel and during the quiescent period the plunger contacts the valve seat in a condition of dynamic rest with simultaneous zero acceleration and zero velocity to regulate the fluid supplied to said device in response to said position signal, whereby fluid is admitted to said device to bias said movable element in such direction so that a change in signal of the sensing means would tend to initiate opposite action.

13. An electropneumatic positioning system for positioning the movable element of a device which is dynamically operable in response to a control signal; said positioning system comprising in combination a fluid supply source, a pulsed-solenoid operated control valve having a solenoid, a valve seat and a dithering valve plunger which vibrates with respect to said valve seat to control flow, said valve being operatively connected to said fluid supply source, control means operatively connected to said control valve for transmitting a current signal to the solenoid of said valve and initiating a magnetically generated force to cause a dithering action of said plunger and to regulate the quantity of fluid passing through said valve in relation to the current signal from said control means, said valve plunger being normally biased away from said valve seat by a force including gravitational force and being urged toward said seat upon initiation of each electrical pulse signal, sensing means operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said current signal and balancing said signals to establish equilibrium conditions, and means in said control means for controlling the current-time history of said plunger to cause a repetitive cycle of said plunger including an opening period, a closing period and a quiescent period, such that during the opening period the plunger never contacts its uppermost limit of travel and during the quiescent period the plunger contacts the valve seat in a condition of dynamic rest with simultaneous zero acceleration and zero velocity to regulate the fluid supplied to said device in response to said position signal, whereby fluid is admitted to said device to bias said movable element in such direction so that a change in signal of the sensing means would tend to initiate opposite action.

14. An electropneumatic positioning system for positioning the movable element of a device which is dynamically operable in response to a control signal; said positioning system comprising in combination a fluid supply source, a pulsed-solenoid operated control valve having a solenoid, a valve seat and a dithering valve plunger which vibrates with respect to said valve seat to control flow, said valve being operatively connected to said fluid supply source, control means operatively connected to said control valve for transmitting a current signal to the solenoid of said valve and initiating a magnetically generated force to cause a dithering action of said plunger and to regulate the quantity of fluid passing through said valve in relation to the current signal from said control means, said valve plunger being normally biased away from said valve seat by a force including gravitation forces and being urged toward said seat upon initiation of each electrical pulse signal, sensing means operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said current signal and balancing said signals to establish equilibrium conditions, and means in said control means for controlling the duration of the current signals to said solenoid to regulate the size of the magnetically generated force to cause a net unbalance of forces on said plunger thereby causing said plunger to move in a repetitive cycle including an opening period, a closing period and a quiescent period, such that during the opening period the plunger never contacts its uppermost limit of travel and during the quiescent period the plunger contacts the valve seat in a condition of dynamic rest with simultaneous zero acceleration and zero velocity to regulate the fluid supplied to said device in response to said position signal, whereby fluid is admitted to said device to bias sad movable element in such direction so that a change in signal of the sensing means would tend to initiate opposite action.

15. The method of positioning the stem of a main valve in response to a change in instrument signal operating said valve, said method comprising sensing the change of the position of the main valve stem, creating an electrical signal in proportion to the change of the position of the main valve stem transmitting said electrical signal to a control circuit operating a dithering solenoid operated pilot valve having a solenoid, a valve seat and a plunger movable with respect to said valve seat, comparing the instrument signal to the signal produced by the change of position of the main valve stem and producing a corrective signal, generating an electrical current in said control circuit and transmitting said current to said solenoid to produce a magnetically generated force, applying said magnetically generated force to said plunger to create a dithering action of said plunger in said pilot valve, permitting said plunger to be normally biased away from the valve seat by a force including gravitational force and being urged toward said valve seat by application of said magnetically generated force, controlling the lift-time history to cause repetitive cycles of vibratory movement of the plunger in said pilot valve thereby effectively regulating the size of an orifice in said pilot valve and thereby controlling the flow through said pilot valve in response to the size of the corrective signal, wherein each of said cycles includes an opening period, a closing period and a quiescent period such that during the opening period the plunger never contacts its upper limit of travel and during the quiescent period said plunger in said pilot valve engages the valve seat in a condition of dynamic rest, creating a pressure between said main valve and said pilot valve in direct proportion to the size of the corrective signal, and regulating the fluid flow to said main valve in response to the change of downstream pressure on said pilot valve until the changing position of the main valve stem produces a signal which eliminates the corrective signal thus produced and achieves a steady state equilibrium position.

16. The method of positioning the stem of a main valve in response to a change in instrument signal operating said valve, said method comprising sensing the change of the position of the main valve stem, creating an electrical signal in proportion to the change of the position of the main valve stem, transmitting said electrical signal to a control circuit operating a dithering solenoid operated pilot valve having a solenoid, a valve stae and a plunger movable with respect to said valve seat, comparing the instrument signal to the signal produced by the change of position of the main valve stem and producing a corrective signal, generating an electrical current in said control circuit and transmitting said current to said solenoid to produce a magnetically generated force, applying said magnetically generated force to said plunger to create a dithering action of said plunger in said pilot valve, permitting said plunger to be normally biased away from the valve seat by a force including gravitational force and being urged toward said valve seat by application of said magnetically generated force, controlling the lift-time history to cause repetitive cycles of vibratory movement of the plunger in said pilot valve thereby effectively regulating the size of an orifice in said pilot valve and thereby controlling the flow through said pilot valve in response to the size of the corrective signal, wherein each of said cycles includes an opening period, a closing period and a quiescent period such that during the opening period the plunger never contacts its upper limit of travel and during the quiescent period said plunger in said pilot valve engages the valve seat in a condition of dynamic rest, maintaining a large force differential across the orifice of said pilot valve in comparison to the other forces acting on the valve plunger of said pilot valve, creating a pressure between said main valve and said pilot valve in direct proportion to the size of the corrective signal, and regulating the fluid flow to said main valve in response to the change of downstream pressure on said pilot valve until the changing position of the main valve stem produces a signal which eliminates the corrective signal thus produced and achieves a steady state equilibrium position.

References Cited

UNITED STATES PATENTS

| | | | |
|---|---|---|---|
| 2,588,522 | 3/1952 | Harris | 251—30 XR |
| 2,789,543 | 4/1957 | Popowsky | 91—459 XR |
| 3,015,768 | 1/1962 | Hornfeck et al. | 137—487.5 XR |
| 3,020,886 | 2/1962 | Jones et al. | 91—459 XR |
| 3,036,598 | 5/1962 | Smith et al. | 91—459 XR |
| 3,250,294 | 5/1966 | Hipple | 251—30 XR |
| 3,266,379 | 8/1966 | Kreuter | 91—459 XR |
| 3,307,824 | 3/1967 | Weisheit | 251—131 |

HENRY T. KLINKSIEK, Primary Examiner

M. O. STURM, Assistant Examiner

U.S. Cl. X.R.

91—363, 459; 251—30